(12) United States Patent
Tomlin, Jr. et al.

(10) Patent No.: US 10,354,232 B2
(45) Date of Patent: Jul. 16, 2019

(54) SYSTEMS AND METHODS FOR OBJECT IDENTIFICATION AND PRICING FOR WASTE REMOVAL AND TRANSPORT SERVICES

(71) Applicants: Fred Tomlin, Jr., Tampa, FL (US); Sherrod Hunter, Tampa, FL (US)

(72) Inventors: Fred Tomlin, Jr., Tampa, FL (US); Sherrod Hunter, Tampa, FL (US)

(*) Notice: Subject to any disclaimer, the term of this patent is extended or adjusted under 35 U.S.C. 154(b) by 975 days.

(21) Appl. No.: 14/619,685

(22) Filed: Feb. 11, 2015

(65) Prior Publication Data
US 2016/0232498 A1    Aug. 11, 2016

(51) Int. Cl.
G06Q 10/00 (2012.01)
G06Q 30/02 (2012.01)
G06K 9/00 (2006.01)

(52) U.S. Cl.
CPC ........ *G06Q 10/30* (2013.01); *G06K 9/00664* (2013.01); *G06Q 30/0206* (2013.01); *Y02W 90/20* (2015.05)

(58) Field of Classification Search
USPC .............................................. 705/7.11–7.42
See application file for complete search history.

(56) References Cited

U.S. PATENT DOCUMENTS

| | | | | |
|---|---|---|---|---|
| 2002/0107661 A1* | 8/2002 | Ainlay | .................... | G01G 19/00 702/174 |
| 2007/0070069 A1* | 3/2007 | Samarasekera | ......... | G06F 3/011 345/427 |
| 2008/0082292 A1* | 4/2008 | Storm | .................... | G06Q 10/08 702/156 |
| 2011/0082782 A1* | 4/2011 | Komac | ................... | G06Q 30/02 705/35 |
| 2013/0085782 A1* | 4/2013 | Raviv | ..................... | G06Q 40/08 705/4 |
| 2013/0132295 A1* | 5/2013 | Horowitz | ........... | G06Q 30/0284 705/330 |
| 2014/0074744 A1* | 3/2014 | Ben-Harosh | ......... | G06Q 10/083 705/335 |
| 2014/0121965 A1* | 5/2014 | Kim | ....................... | G01C 21/20 701/527 |
| 2014/0149306 A1* | 5/2014 | Olsen | ................ | G06Q 10/08345 705/330 |
| 2016/0055506 A1* | 2/2016 | Tama, Jr. | ........... | G06Q 30/0206 705/7.35 |

OTHER PUBLICATIONS

Kim, et al., "Operations and implementation of complex objects", IEEE transactions on software engineering, 1988. (Year: 1988).*
"Junk Shot" App—Mobile Junk Removal Software Application, Accelerated Waste Solutions of North America, LLC, Inc., Apple iTunes, Jan. 16, 2014.
"Capital Junk" App, Jaydeep Patel, Apple iTunes, Dec. 5, 2011.
"Junk Removal" App, Anyjunk Limited, Apple iTunes, Jun. 16, 2011.

* cited by examiner

*Primary Examiner* — Amber A Misiaszek

(57) ABSTRACT

The disclosure generally relates to systems and methods for automated object identification and pricing for waste removal and transport services. In an exemplary embodiment, the disclosure relates to utilizing a mobile device to capture a scene with items requiring removal and/or transport, and performing object and spatial recognition on objects in the scene to provide a cost for service on the objects.

20 Claims, 8 Drawing Sheets

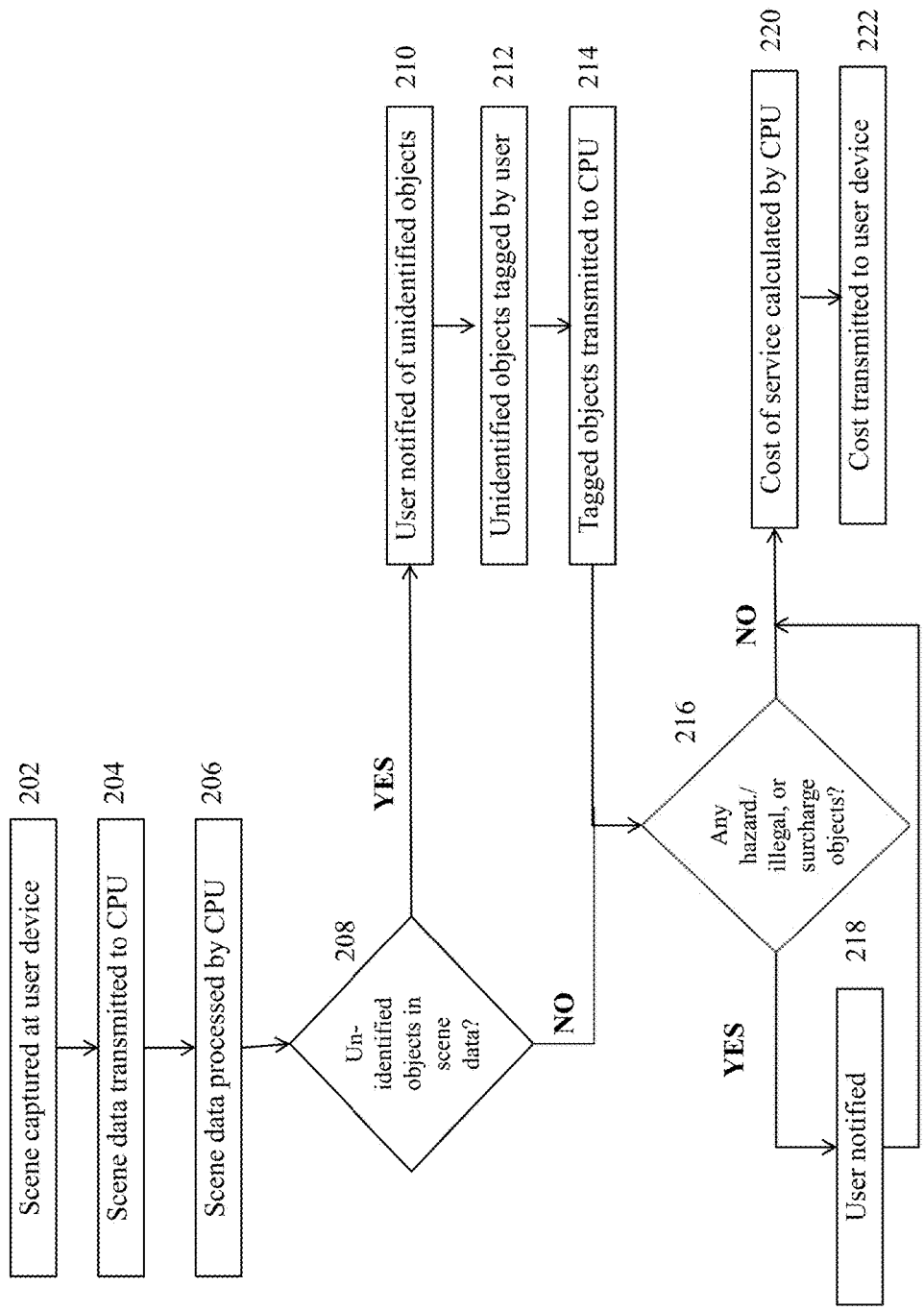

SYSTEMS AND METHODS FOR OBJECT IDENTIFICATION AND PRICING FOR WASTE REMOVAL AND TRANSPORT SERVICES

BACKGROUND

Field of the Invention

The disclosure generally relates to systems and methods for object identification and pricing for waste removal and transport services. More specifically, the disclosure relates to capturing a scene and detecting objects within the scene, and calculating a cost for servicing the objects based on, for example, the objects' volume and transport distance.

Description of Related Art

Current systems and methods for obtaining an estimated cost or price quotation for waste removal and transport services typically require a manual inspection by the service provider. For example, a service provider must physically schedule a time to inspect the user's location. During the scheduled time, the service provider must then manually measure the various objects and items that the user wishes to have removed or transported from the location. In most cases, the service provider's representative may not be able to provide an immediate quotation. Instead, the service provider collects the information from the user's location and provides an estimated cost at a later time. At this later time, if the cost is agreeable to the user, the user and service provider schedule another visit in which the service will be provided.

Thus, in order for a user to have items removed or transported from their location, multiple visits from a service provider must be scheduled, and both parties are required to expend time and resources before a sale transaction even takes place. In addition, the service provider typically manually measures the dimensions of each desired object, and manually calculates an estimated service cost that is likely based on limited variables, such as the volume being transported, and the distance of travel.

To address the above challenges, Applicant has developed a software application entitled "Junk Shot", by which a user can take a photograph or video of a scene of objects desired to be removed. The user's device then transmits the scene data to Applicant via the software application. Applicant subsequently manually provides an estimated quotation to the user based on a visual inspection of the scene data.

Similar to Applicant's "Junk Shot" software application, CapitalJunk.ca and Anyjunk Limited have similar software applications where static photographs or videos of a scene can be taken by a user and transmitted to the service provider for quotation purposes.

However, it is difficult, if not impossible for Applicant and these other third-party service providers with similar software applications to provide a truly accurate price quotation, as a manual inspection of photographs or videos does not provide precise dimension and volume measurements for the objects contained therein. Also, the interaction between the user and the service provider is limited, as there is no two-way video or voice communication integrated with these software applications. Furthermore, the estimated price quotation is likely limited and may not contain dynamic inputs such as traffic data, toll costs, weather data, variable overhead and labor costs, etc.

Therefore, there is a need for systems and methods that allow a user to receive a real-time, or near-real time, quotation for waste removal and transport services by simply transmitting scene data to a service provider, and where a service provider can quickly and efficiently provide a price quotation using mathematical models that incorporate object and spatial recognition and dynamic inputs to provide a more accurate price quotation than current manual methods being employed.

SUMMARY

In one embodiment, the disclosure relates to a system for calculating a cost for waste removal and transport services comprising: a mobile device comprising an optical recording device, a location transceiver, a display, and a wireless communication transceiver coupled to the optical recording device, the mobile device configured to capture scene data using the optical recording device, and transmit the scene data and location transceiver data using the wireless communication transceiver; and a server comprising a communication transceiver configured to receive the scene data and the location transceiver data from the wireless communication transceiver, a central processing unit, and a memory, the central processing unit (CPU) programmed to: identify objects in the scene data, calculate a cost to transport the identified objects from a location corresponding to the location transceiver data to a second location, wherein the cost is calculated based at least in part on a volume of the identified objects, the location transceiver data, the second location, and labor costs; and transmit the cost to the mobile device, via the communication transceiver, for visual representation on the display.

In another embodiment, the disclosure relates to a method for calculating a cost for item transport services comprising capturing scene data, at a mobile device comprising an optical recording device, a location transceiver, a display, and a wireless communication transceiver wirelessly transmitting the scene data and location data provided by the location transceiver from the mobile device to a server, wherein the server comprises a central processing unit (CPU); identifying, by the server CPU, objects in the scene data; calculating, by the server CPU, a volume of each identified object in the scene data using spatial data encoded in the scene data; using a mathematical model to calculate, by the server CPU, a cost to transport the identified objects data based at least in part on the aggregate volume of the identified objects and the location data; transmitting the cost from the server to the mobile device; and displaying a visual representation of the cost on the display of the mobile device.

In still another embodiment, the disclosure relates to a mobile device for calculating a cost for waste removal and transport services comprising: an optical recording device configured to capture scene data; a central processing unit (CPU) communicatively coupled to the optical recording device; a location transceiver communicatively coupled to the central processing unit, and configured to provide a location of the mobile device; a user interface communicatively coupled to the central processing unit, wherein the central processing unit is programmed to: identify objects in the scene data, calculate a cost to transport the identified objects from the location to a second location, wherein the cost is calculated based at least in part on a volume of the identified objects and the distance between the location and the second location, transmit the cost to the display on the mobile device, and display a visual representation of the cost on the user interface.

BRIEF DESCRIPTION OF THE DRAWINGS

These and other embodiments of the disclosure will be discussed with reference to the following exemplary and non-limiting illustrations, in which like elements are numbered similarly, and where:

FIG. 2 is a flowchart illustrating the steps taken by an embodiment of the present invention;

DETAILED DESCRIPTION

Figure 1:
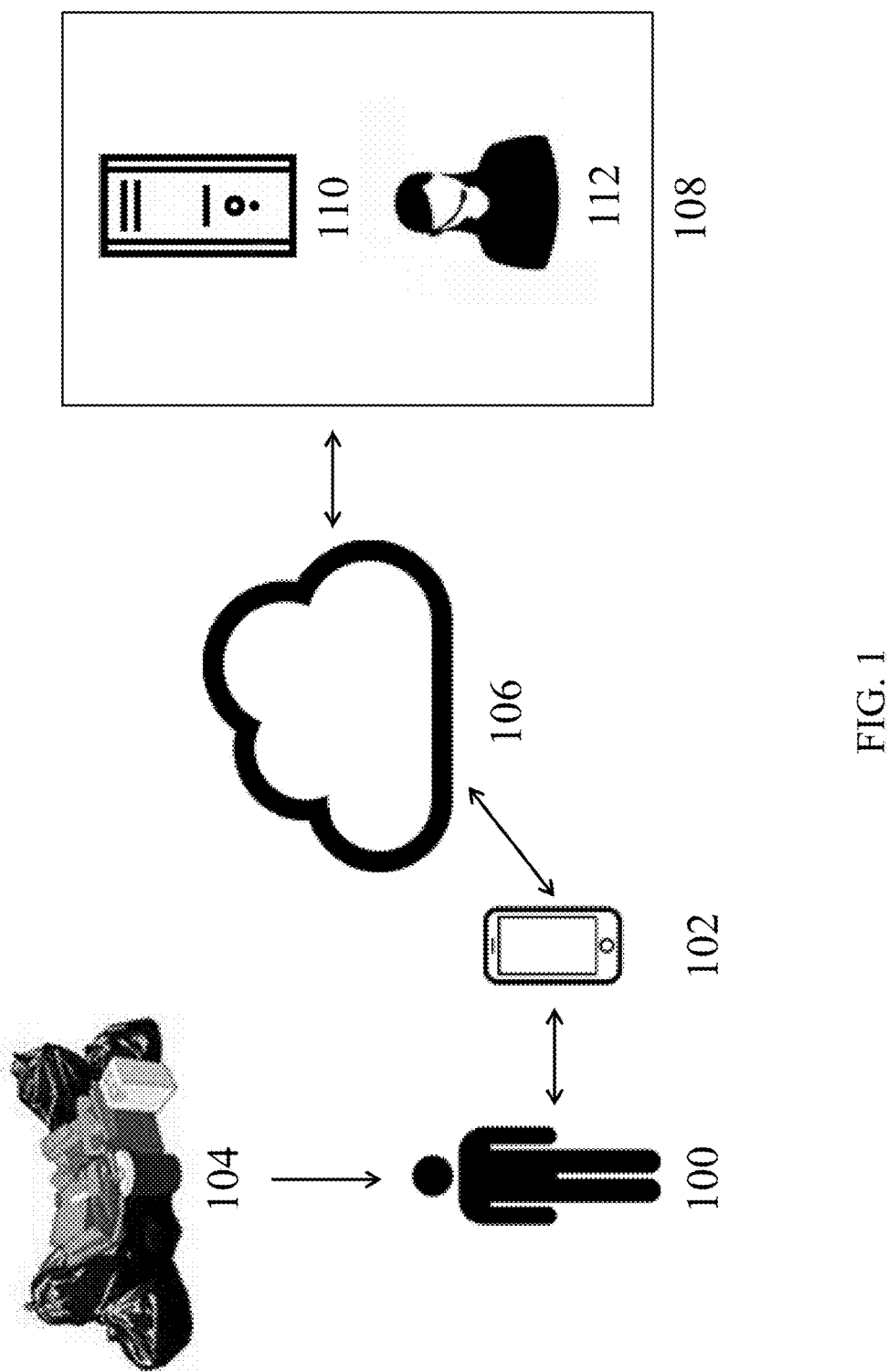
FIG. 1 shows an exemplary block diagram of a network architecture utilized by an embodiment of the present invention.

FIG. 1 shows an exemplary block diagram of a network architecture utilized by an embodiment of the present invention. A user 100 can be an individual, such as, for example, a home owner or business owner, or the user 100 can be an organization, such as a business, governmental entity, academic institution, a not-for-profit, etc. The user 100 utilizes a user device 102, which can be any computing device capable of connectivity to a network, which has a data communication receiver, transmitter, and/or transceiver, and which has optical data capture and optical recording means. The user device 102 can include, for example, mobile phones, still and video cameras, portable media players, desktop computers, laptop computers, netbooks, smartphones, tablet computers, wearable devices, "smart" watches, "smart" bracelets, "smart" necklaces, enhanced vision devices and systems, augmented vision headsets/glasses, and internet-connected streaming media devices. In an embodiment, the user device 102 is held or worn by, or coupled to, the user 100. In another embodiment, the user device 102 can be permanently or removably affixed to another structure, such as a vehicle interior or exterior (i.e., truck, car, van, airplane, drone, golf cart, bulldozer, construction vehicles, landscaping vehicles, etc), a distance measuring wheel, or surveying equipment.

In operation, the user 100 captures an image of a scene 104 with the user device 102. The optical recording device can be a camera lens, video camera lens, wearable lenses, contact lenses, or other optical imaging device coupled to a camera, video recording device, local memory, remote memory, or other portable device, such as a smartphone or watch. The image is not limited to a still image, and can include video data, audio data, three-dimensional coordinates, and spatial data. The scene 104 includes, partially or in its entirety, objects which the user 100 desires to have removed and/or transported by a service provider 108. The service provider 108 can include, but is not limited to, entities specializing in waste management, garbage pickup and removal, recycling, hazardous materials disposal and cleanup, disaster restoration and recovery, landscaping and gardening, building demolition, building construction, surveying, moving services, hauling services, short- and long-term storage, handyman services, snow removal, and debris removal.

The user device 102 is communicatively coupled to a server 106, which may be located remotely from the user device 102. The user device 102 accesses the server 106 via a communication network, such as a wireless network, a landline network, or a short-range connection (i.e., Bluetooth, Zigbee, infrared, etc.). In an alternative embodiment, the server 102 can be downloaded or installed locally on the user device, such as in the form of a software application. The server 102 can include a communication transceiver, communication protocol software, application layers, a central processing unit, and memory.

The server 106 is communicatively coupled to a service provider 108. The service provider 10 has a system that includes, for example, at least one central processing unit (CPU) 110 and a third-party representative 112. The CPU 110 can include more than one databases having data sources that are proprietary or external to the service provider 108. For example, a proprietary database may include the service provider's 108 client lists, pricing data, financial data, etc. An external database may include map and navigation data, fuel cost data, and weather data. In addition, the CPU 110 can include at least one memory having stored algorithms, formulas, and mathematical models, as well as at least one processor to perform computations using the algorithms, formulas, and mathematical models.

In an embodiment, the CPU 110 can include a single database that combines and maintains data from multiple sources, both proprietary sources and external sources, where the external sources are refreshed by the CPU 110 on a periodic basis.

The service provider 108 can also include, for example, a representative 112. In an embodiment, the representative 112 is a live, human operator located either physically at the service provider's 108 location, or at a remote location, such as at an on-shore or off-shore call center. The representative 112 can be a single individual, or a plurality of individuals.

In an alternative embodiment, the representative 112 is a software-based attendant that provides responses to the user 100. The representative 112 may be powered by technology similar to Apple, Inc.'s Siri®, which provides real-time responses to user inquiries.

FIG. 2 is a flowchart illustrating the steps taken by an embodiment of the present invention. In step 202, the user 100 captures an image of a scene 104 with the user device 102, as described above. In an embodiment, the user device 102 is actuated manually by the user 100 to begin the data capture. In another embodiment, the user 100 is located remotely from the user device 102, and the data capture is initiated via a remote command signal. In an embodiment, a software application on the user device 100 is configured to automatically capture the scene 104 by adjusting and optimizing various optical parameters, such as zoom, frame size, focal length, contrast, color, and lighting/flash. In this embodiment, the software application performs edge detection to determine the scene boundaries in order to capture an appropriate region.

In yet another embodiment, the user device 102 is controlled by the representative 112, and the representative 112 remotely controls the optical device on the user device 102, and remotely actuates data capture.

In step 204, the captured data is transmitted from the user device 102 to the CPU 110 via the server 106. The captured data may be transmitted/streamed from the user device 102 in real-time or near real-time, as the user device 102 is capturing data from the scene 104. In another embodiment, the user device 104 can capture multiple images or video sequences of the scene 104. For example, the user 100 may capture a close up of specific objects in the scene 104, as well as a set-back view from a distance showing multiple objects and their surrounding environment. In addition, the user 100 may capture a standard or panoramic view of the scene 104 with the user device 102.

In another embodiment, the user device 102 can capture data from multiple, different scenes. For example, the user 100 may require a quotation for multiple rooms in their home, or multiple areas where objects are to be removed. In this embodiment, the user device 104 can transmit data from each area in real time as it is being captured, or alternatively, the user device 102 can store data captured from each area, and transmit all of the captured data in a single batch after all recording is completed by the user 100 and the user device 102.

In addition to audio/visual data which may be captured by the user device 102, the user device 102 can be capture various spatial and geographical data related to the scene 104. The location and geographical data can be provided by a location transceiver coupled to the user device 102, or coupled to the user 100, or located in the vicinity of the scene 104 and communicatively coupled to the user device 102 or to the service provider 108. For example, the geo-location and/or GPS satellite coordinates of the user's device 102 at the time of data capture can be transmitted to the CPU 110. The location data may be generated based on a GPS module, by using signal strengths of home and neighboring network cells, by using a subscriber identity module (SIM) to obtain raw radio measurements from the mobile device, or by using WiFi data. The location data enables the CPU 110 to accurately identify the location where services are being requested by the user 100. In addition, spatial data from various sensors, such as accelerometers, gyroscopes, and depth sensors, for example, can also be transmitted along with audio/visual data from the user device 102 to the CPU 110.

In an embodiment, terrain mapping sensors may be included in the user device 102, and can capture and transmit various information related to the geometry, contour, slope, grade, etc. of the environment where the scene 104 is located. For example, if the user 100 desires to have brush and yard waste removed, it may be useful for the service provider 108 to understand the terrain to ensure that proper vehicles are dispatched for the service.

In an embodiment, the user 100 can tag objects within the scene 104. The tagging process allows the user 100 to associate a name or description with the object, either via text input or verbal input into the user device 102. The tag data can also be transmitted along with the audio/visual, spatial, and geographical data from the user device 102 to the CPU 110.

In yet another embodiment, if the user 100 has previously captured the scene 104, the user 100 can upload an image, video, audio file with a verbal description, or computer-assisted drawing of the scene 104 for transmission to the CPU 110. If the user 100 has posted an image or video of the scene 104 to a social network or social media account, such as on Facebook, Instagram, Twitter, Yelp, Flickr, YouTube, Vimeo, Snapchat, Dropbox, Box, or other social or sharing platform, the user 100 can send a link to the content to the service provider 108.

In another embodiment, the user device 102 may include a radio-frequency identification (RFID) reader, barcode scanner, or other optical reading means capable of sensing and decoding an RFID tag or machine-readable code, such as a barcode, quick response (QR) code, or dot matrix code. If objects in the scene 104 include a RFID tag or machine-readable code, the user device 102 is capable of reading/interrogating the objects to obtain their description. The description may include the item name, quantity, volume, weight, dimensions and any other identifying information, such as a hazardous material designation or special handling instructions. This information may be encoded with the captured data and transmitted to the CPU 110.

In addition, the user 100 may provide a requested date and time for service, or a plurality of dates and times or a date range, which can be transmitted to the CPU 110, and used for cost estimation and scheduling purposes.

In step 206, the transmitted data is processed by the CPU 110. In an embodiment, the CPU 110 performs object recognition of the scene 104. Various methods may be applied by the CPU 110 to perform objection recognition. In an embodiment, machine learning and artificial intelligence is used to extract objects from the scene 104 and compare them to known objects in a database coupled to the CPU 110.

In another embodiment, the CPU 110 analyzes various curves, points, contours, boundaries, dimensions, etc. of the two-dimensional scene 104, and creates a three-dimensional representation using, for example, shade modeling. A uniform surface topography can be extracted from the three-dimensional representation, using shape-from-shading techniques.

Other object recognition techniques that can be employed include, for example, edge detection and appearance-based methods that recognize changes in lighting, color, viewing direction, size, and shape, such as edge matching, divide-and-conquer searching, grayscale matching, gradient matching, histograms, and using large model bases. In addition, feature-based methods may also be employed, including, but not limited to, comparison to known objects, interpretation trees, hypothesizing and testing, pose consistency, pose clustering, invariance, geometric hashing, and scale-invariant feature transform, and speeded up robust features.

In another embodiment, the CPU 110 may employ optical character recognition (OCR) technologies to read labels on various objects, such as on gasoline tanks, prescription bottles, batteries, etc., to not only identify objects, but also to determine if the objects may be hazardous materials, prohibited items, illegal items, or items that require a surcharge for removal and/or disposal.

In addition to object recognition, the CPU 110 may employ depth estimation technologies to determine the size, dimensions, volume, and weight of objects in the scene 104. The user device 102 may include laser ranging, a stereo camera, a coded aperture, or other devices capable of generating a range image that has pixels corresponding to the relative distance in the scene 104. Other techniques that may be utilized by the user device 102 and/or the CPU 110 for depth estimation include, but are not limited to, using a three-dimensional scanner, height-mapping, kinect technologies, light-field cameras, photogrammetry, time-of-flight cameras, intensified CCD cameras, and optical flow methods.

In embodiment, the focal length of the optical recording device on the user device 102, such as the camera lens or aperture, is used in conjunction with a known distance to an object in the scene 104, to determine the dimensions of that object. After determining the dimensions, a volume of the object can be calculated using known mathematical models.

In an embodiment, after an object is detected, the object may be compared to known objects in a database to determine a size, dimensions, volume, weight, or any other characteristic or property associated with the object, based on the known object data.

Thus, in an embodiment, the CPU 110 is configured to computationally determine the type, weight, quantity, dimensions, size, and volume of objects in the scene 104, using, for example, the methods described above. The above methods have been described as being performed by the CPU 110 located at the service provider 108, however, the CPU 110 can be located physically on or communicatively coupled to, the user device 102, or the CPU 110 can be located on the server 106. In an embodiment, if a CPU and a software application on the user device 102 perform the above described processes, metadata, attributes, and other information may be encoded with the captured data by the software application prior to the captured data being transmitted to the CPU 110 or to the server 106.

Furthermore, a combination of devices and systems may perform processing, such that, for example, OCR is performed by the software application, and spatial recognition is performed by the service provider 108. In addition, the service provider 108 and server 106 can be combined into a single system, and the service provider 108 and server 106 may be used interchangeably as both systems are capable for bi-directional communication with the user device 102, and both systems may contain the processors, memory, and databases required to perform the detection and recognition of objects, edges, and spatial dimensions described herein.

In another embodiment, the user device 102 may be communicatively coupled with a scale, such as via a short-range wireless connection (i.e., Bluetooth, infrared, Zigbee, etc.), or via a hard wire connection (i.e., USB, Firewire, Ethernet, LAN, etc.). The user 100 can place objects desired for removal on the scale, and the weight may be automatically transmitted from the scale to the user device 102, and subsequently, to the service provider 108 via the server 106. Alternatively, the CPU 110 may be directly communicatively coupled to the scale, and the scale may transmit weight data directed to the CPU 110.

In yet another embodiment, the user device 102 may determine the volumetric weight of objects in the scene 104 using spectroscopy or spectral absorbance measurements.

In step 208, if there are any objects in the scene 104, or areas of the image where object detection failed, the CPU 110 generates a cropped version of these objects and/or areas of the scene 104. The cropped version is transmitted to the user device 102 via the server 106 in step 210. The user 100 has the opportunity to input into the user device 102 various information related to the unrecognized objects/areas in step 212. If the cropped version includes objects that require removal, the user can input a description, quantity, weight, volume, special handling instructions, dimensions, etc. of the object. The user can enter the descriptive information/tags either by manual text input into the user device 102, or by verbal or gesture input.

In an embodiment, instead of a cropped version of the scene 104, the CPU 110 generates thumbnail images of the portions of the scene 104 that contain unidentified objects. In another embodiment, the CPU 110 highlights portions of the scene 104 that contain unidentified objects. In yet another embodiment, the CPU 110 enlarges or zooms in on portions of the scene 104 that contain unidentified objects.

After the user 100 provides sufficient information related to the unrecognized objects/areas in the cropped version generated by the CPU 110, the input data is transmitted to the CPU 110 via the server 106 in step 214.

In step 216, the CPU 110 determines if any of the detected objects in the scene 104 are hazardous materials, prohibited items, illegal items, or items that require a surcharge for removal and/or disposal. This determination can be made, for example, by the CPU 110 comparing the detected objects against a local, state, federal, or international database of hazardous, illegal, or prohibited items, as well as a proprietary database maintained by the service provider 108. The CPU 110 also determines if any detected objects require a surcharge for removal/disposal, or if any detected objects are not eligible for service, and the user device 102 displays a notice to the user 100 in step 218.

In an embodiment, the CPU 110 can determine appropriate disposal recommendations for the detected objects. For example, a gasoline can may be designated as a recyclable item, whereas garbage bags may be designated as landfill items. The disposal recommendation for each detected object is transmitted to the user device 102.

In step 220, the CPU 110 calculates an estimated service cost for the user 100 based on, for example, at least one of following elements: the detected objects, the location of the scene 104, the location of the user 100, the requested service date(s), fuel costs, disposal costs, recycling costs, taxes, traffic patterns, weather patterns, overhead costs, and the availability of service vehicles and employees. In a preferred embodiment, a combination of the various elements listed above is utilized by the service provider 108 to determine a cost for the user 100. The cost can be a cost to transport the detected objects from the user 100 location to a disposal location or a storage location.

For example, the third-party system may determine that the scene 104 contains a small box having a dimension of two by two feet, and a cylindrical garbage can having dimensions of three feet by two feet. The volume of these objects is computed, and along with transportation and labor costs, as well as recycling/dumping fees and taxes, and the estimated service cost can be calculated for the user 100. In an embodiment, the aggregate volume of the objects is used to determine the cost.

In addition to the estimated service cost calculation, the CPU 110 compares the requested service date(s) provided by the user 100 against its calendar to determine availability on the requested date(s) and time(s).

In an embodiment, the CPU 110 can provide an exact cost, a not-to-exceed cost, a cost range, or a minimum cost to the user 104. The cost may be contingent upon a physical inspection on the scene 104 and/or objects by the service provider 108 during time of service. In step 222, the cost and available date(s)/time(s) of service are transmitted to the user device 102 via the server 106, and displayed to the user 100. The user 100 can subsequently confirm a service date and schedule the service. Upon confirmation by the user 100, the service provider 108 can send an e-mail, text message, multi-media message, or social network message receipt and reminder of the scheduled service to the user 100.

In another embodiment, after the CPU 110 calculates the cost, the representative 112 contacts the user 100 via a telephone call or video conference to explain the cost, and to provide responses to any questions the user 100 may have.

Figure 3A:
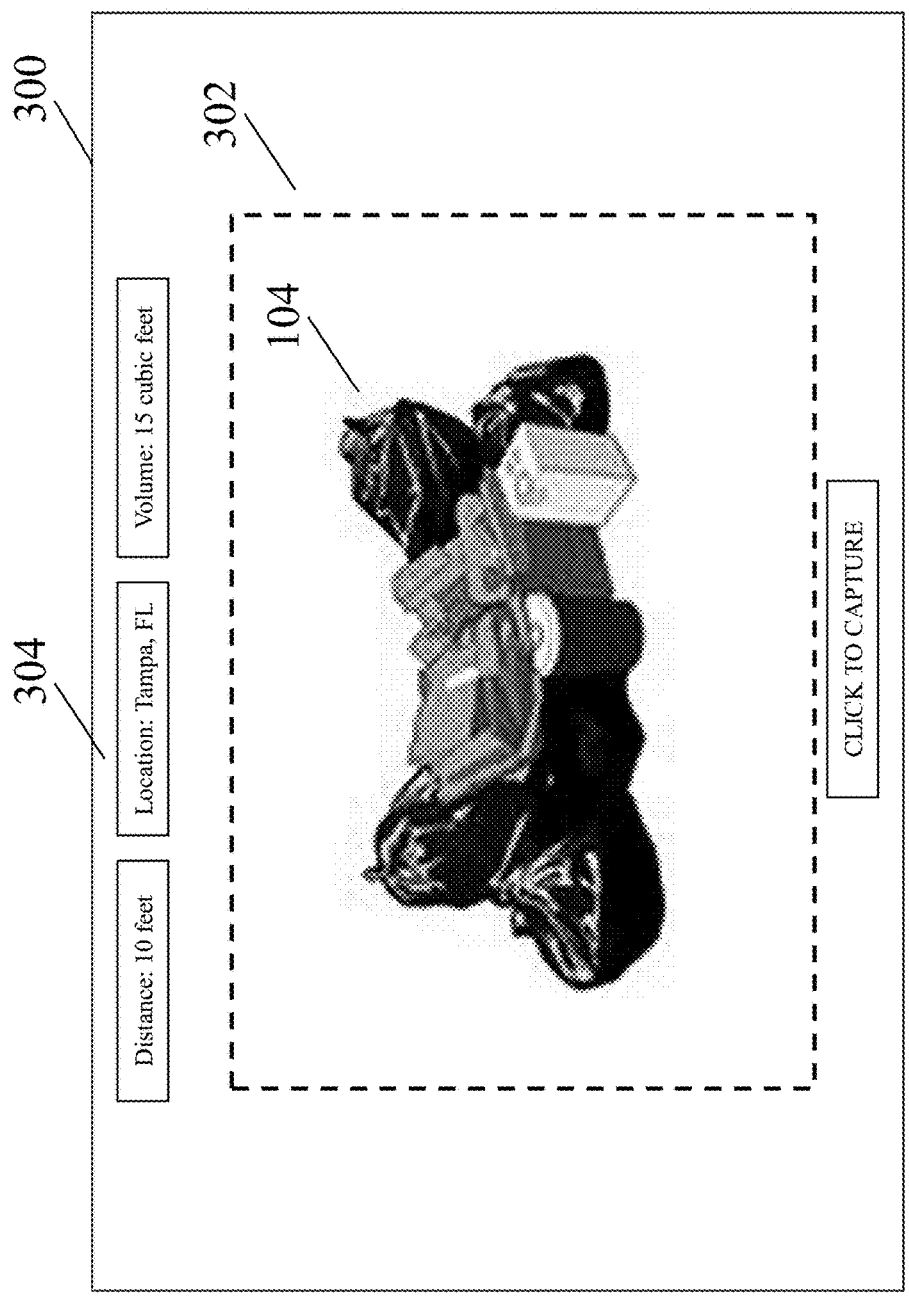
FIGS. 3A and 3B are screen layouts of a scene capture interface in an embodiment of the present invention.

FIG. 3A is a screen layout of a scene capture interface in an embodiment of the present invention. In an embodiment, the user device 102 includes a software application 300 that performs the functions described herein. The software application 300 may be developed, owned, or licensed by the service provider 108, and may be exclusive to the service provider 108. In another embodiment, software application 300 is independent from the service provider 108, and the software application 300 may be connected to various different service providers via an application programming interface (API). For example, in order to provide the user 100 with multiple, competitive quotations for services, the software application 300 can transmit the scene 104 data to multiple third-party providers for cost estimation and scheduling purposes. The user 100 may then receive multiple quotations and multiple options for service days and times from multiple third-party providers. In this embodiment, a service provider may pay a premium to have their quotations appear at the top of a list of quotations.

In an embodiment, the software application 300 may display advertisements for various other third-parties services, such as for moving services, landscaping services, real estate listing, home renovation services, etc. The service provider 108 or provider of the software application 300 may receive advertising fees from parties placing the advertisements, and may also receive click-through fees when advertisements are selected by the user 100.

Software application 300 includes an interface that contains a capture area 302, and may include various information areas 304. Information areas 304 can provide a user, for example, a distance indication, a volume indication, a lighting or flash warning, a location of the user device 102, an estimated volume of the imaged objects, and a capture type (three-dimensional, panoramic, x-ray, heat map, etc.). The user 100 can manipulate the user device 102 so that the scene 104 fits within the capture area 302.

In an embodiment, the software application 300 automatically sizes and shapes the capture area 302 based on the detection of objects, edges, and spatial dimensions in the scene 104. This detection can be done locally on the software application 300 on the user device 102, or it may be done remotely on the server 106 or the CPU 110, as described above. After the capture area 302 is automatically sized, a capture is automatically taken of the scene 104, which can be a still image, a video, and a three-dimensional image.

Figure 3B:
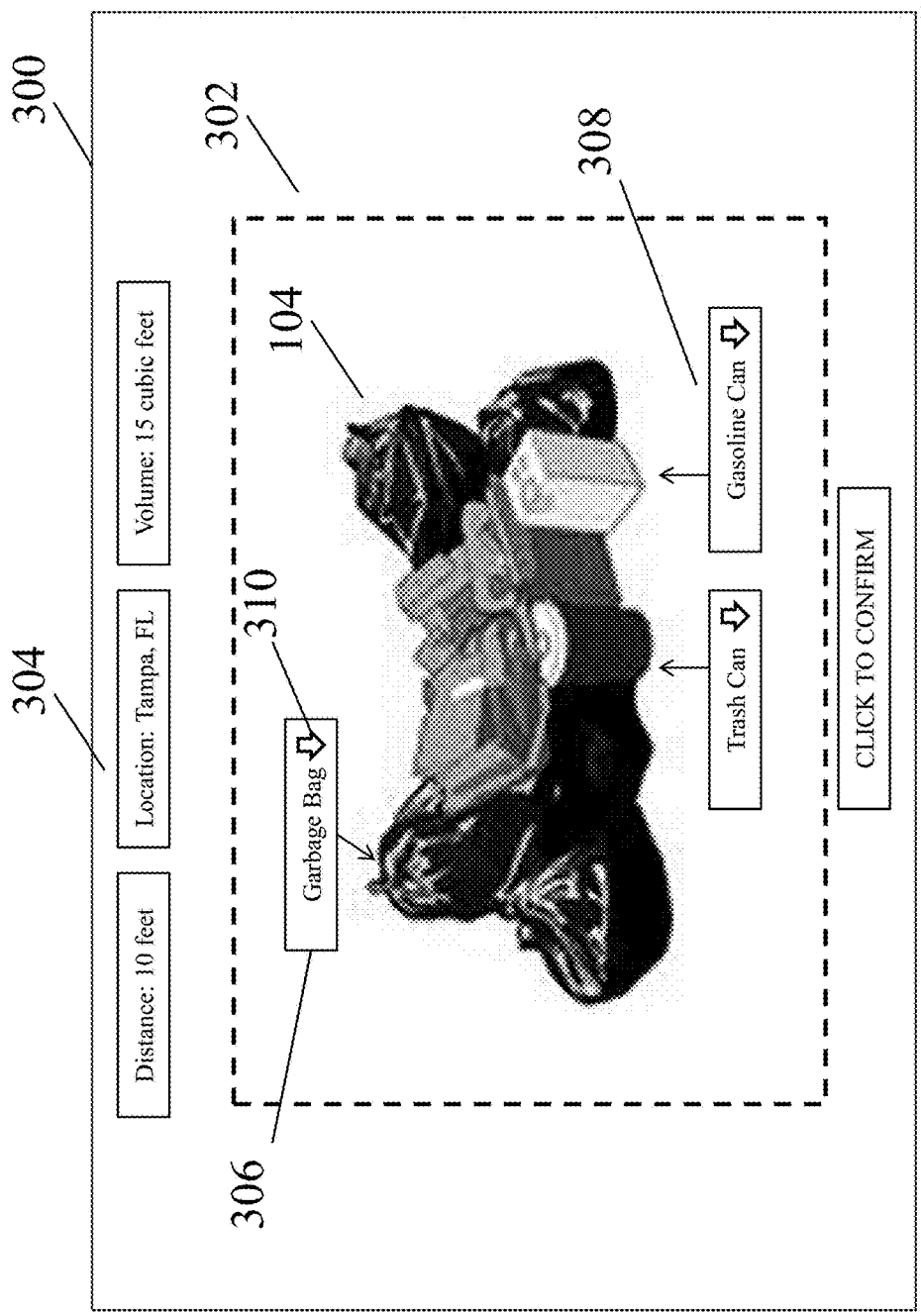

In FIG. 3B, objects in the scene 104 are tagged and labeled automatically by the software application, server 106, or CPU 110. For example, label 306 indicates that an object is a "garbage bag", and label 308 indicates that an object is a "gasoline can". In an embodiment, a selector 310 next to a label allows the user to input additional information related to the selected object, such as weight, quantity, dimensions, size, and volume. In addition, the user 100 is provided the opportunity to edit or modify the suggested label, or to delete the label if the user 100 does not require the identified object to be removed.

In an embodiment, in addition to labels being displayed, an estimated cost for removal for each specific object in the scene 104 is displayed to the user, thereby providing a user of an estimated cost of service per object. In an embodiment, the user 100 can make a payment to the service provider 108 via the software application 300 at the time of confirming the cost and or scheduling. The payment may be a down payment, partial payment, deposit, or a full payment based on the calculated estimated cost.

In an embodiment, the user device 102 may include a digital x-ray camera which allows the inspection of objects that may be stored within other objects. For example, in order to determine if hazardous materials are located in the scene, the x-ray camera can provide a view inside garbage bags, garbage cans, cardboard boxes, and other structures and containers. Objects within other objects may then undergo object, edge, and spatial detection and recognition as described above, and may subsequently be tagged and labeled.

For example, an x-ray camera can determine if there are glass or plastic items within a trash receptacle, and can provide disposal recommendations for these items. Thus, the entire receptacle may not be designated to a landfill, and recyclable items can be sorted appropriately, either by the user or by the service provider 108 at the time of service.

In yet another embodiment, the user device 102 can include an a radiation detector in order to detect for hazardous radioactive materials in the scene 104. In another embodiment, the user device 102 can include an acoustic water detection sensor to detect the presence of liquids which may be contained within objects in the scene 104.

Figure 4:
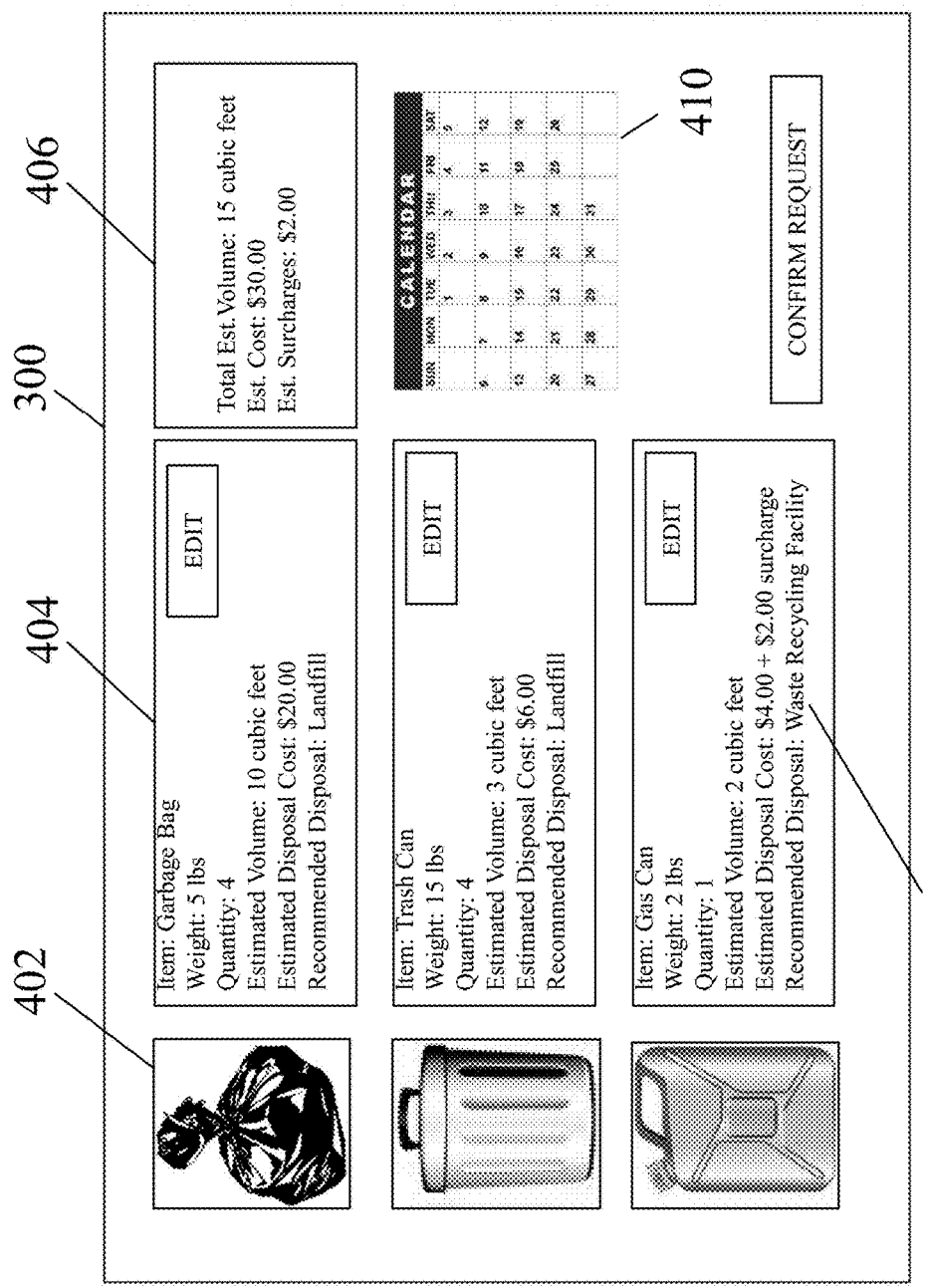
FIG. 4 is a screen layout of an object confirmation interface in an embodiment of the present invention.

FIG. 4 is a screen layout of an object confirmation interface in an embodiment of the present invention. After all desired objects to be removed have been identified and labeled, the user 100 has the opportunity to review and edit the selected objects 402 and their related information 404. An estimated total weight 406 is displayed on the object confirmation screen 400. In an embodiment, the estimated total weight 406 is calculated by the software application 300, the server 106, or by the CPU 110, as described above. In another embodiment, the user 100 may enter the estimated total weight 406 manually.

In an embodiment, a recommended or mandatory disposal procedure 408 is displayed on the user device 100. For example, a gasoline can may be designated as a recyclable item, whereas garbage bags may be designated as landfill items.

In an embodiment, the user 100 can select desired date(s) and time(s) for service using a calendar selection interface 410, or by manually inputted text or verbally speaking the desired service date(s) and time(s).

Figure 5:
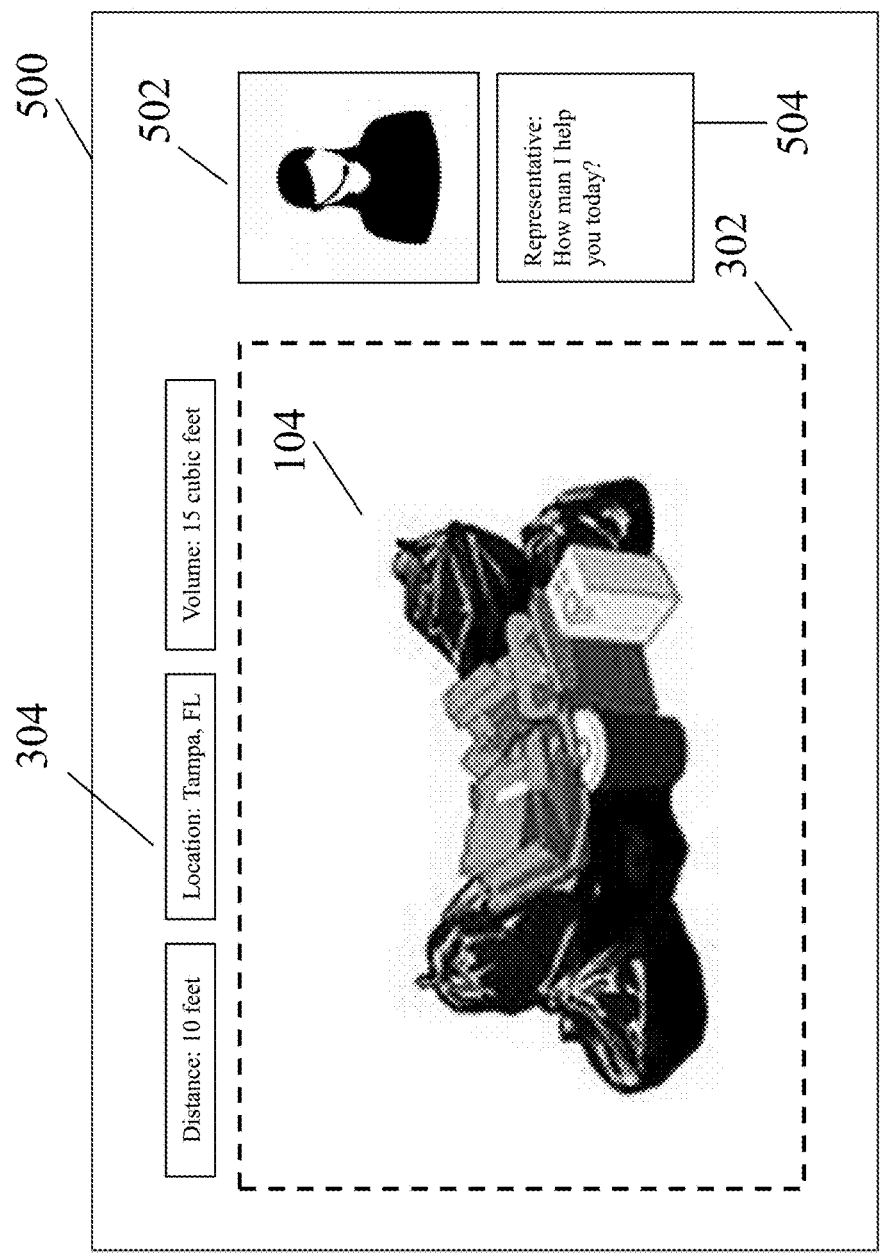
FIG. 5 is a screen layout of a video-consultation interface in an embodiment of the present invention.

FIG. 5 is a screen layout of a video-consultation interface in an embodiment of the present invention. Upon loading the image capture interface 302, or upon loading the software application 300 on the user device 102, a video-consultation interface 500 is displayed to the user 100. In an embodiment, the video-consultation interface 500 includes a streaming video portion 502 allowing the user to view and communication in real-time with a representative 112 from the service provider 108. The representative 112 can have the ability to control various camera functions on the user device 102, such as zoom, pan, tilt, as well as the capture type—still, video, panoramic, three-dimensional, x-ray, heat map, etc.

In an embodiment, the user 100 may provide verbal or manual input (via, for example, a chat window 54) to the user device 102 to describe the scene 104 and objects therein to the representative 112. Alternatively, the software application 300, server 106, or the service provider 108 can perform object, edge, and spatial detection and recognition as described above, and objects in the scene 104 may automatically be tagged and labeled. The user 100 can then verify the accuracy of the labels, or edit/modify the labels as appropriate, with or without the assistance of the representative 112.

In yet another embodiment, the chat window 504 provides a closed captioning of the verbal communication between the user 100 and the representative 112. At the end of the video-consultation, the service provider 108 can send a transcript of the session to the user 100 via, for example, e-mail, text message, multi-media message, or social network message In addition, the representative 112 may provide a real-time quotation and provide scheduling options to the user 100. The combination of scene recognition and object identification technologies, along with a real-time video consultation with the representative 112 provides a unique improvement to existing technologies related to receiving quotations for waste removal and related/complementary services.

In an alternative embodiment, the representative 112 may be a software-based attendant, and the streaming video portion 502 may display a graphical avatar or caricature, in lieu of a live person.

Figure 6:
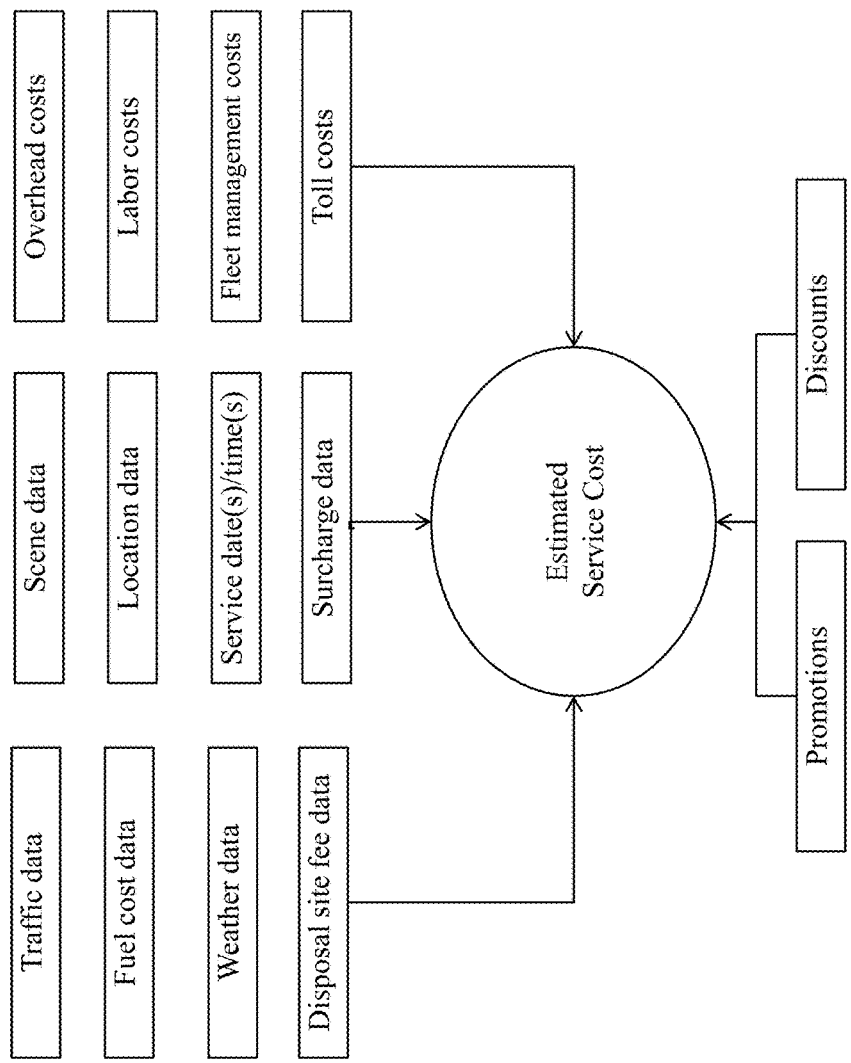
FIG. 6 is an exemplary block diagram of a pricing system utilized by an embodiment of the present invention.

FIG. 6 is an exemplary block diagram of a pricing system utilized by an embodiment of the present invention. In an embodiment, various proprietary and external data sources are used by the CPU 110 to calculate an estimated cost for removal/transport of desired objects in the scene 104. For example, scene data 104 can be processed by the CPU 110 so that a total volume of the desired objects is determined, as described above. The total volume determination may then be input into a mathematical model along with location and distance data (i.e., a distance from the service provider vehicle starting location to the user's location, a distance from the user's location to appropriate disposal facilities, and a distance from appropriate disposal facilities to the service provider vehicle's ending location, such as a storage facility or parking lot). In addition, the service provider's 108 overhead, labor, vehicle fleet management/maintenance, and road toll costs that may be incurred by the service provider 108 may be used as inputs, along with traffic congestion data, fuel cost data, weather data, and disposal site fee data. In an embodiment, not only area various travel distances for the service provider's 108 vehicle calculated, but these distances are correlated with traffic congestion data, road condition data (i.e., dirt and gravel roads and potholes would result in added wear and tear on the vehicle, and may increase the service cost), toll data, and estimated fuel consumption and fuel cost data, to provide a true cost for travel. Weather data may be correlated as well, i.e., inclement weather may cause travel delays, thus incurring additional fuel and vehicle wear and tear costs.

In an embodiment, requested and/or available service date(s) and time(s) may be used as inputs to the mathematical model, whereby service costs may be increased for after hours service, weekend service, or holiday service.

The CPU 110 may also deduct a portion of the estimated service cost based on any current promotions offered by the service company 108, such as, for example, social media-based promotions (i.e., save 5% on a service by "Liking" the service provider's Facebook page, etc.). In addition, any pre-negotiated or real-time discounts based on a volume or a preferential relationship with the user 100 may be applied. For example, if the volume increases beyond a certain threshold, a discount may be applied, or if the user 100 is a repeat user, or has a contract with the service provider 108, an applicable discount may be applied (i.e., government contract, long-term contract, discount based on repeat services, etc.).

Figure 7:
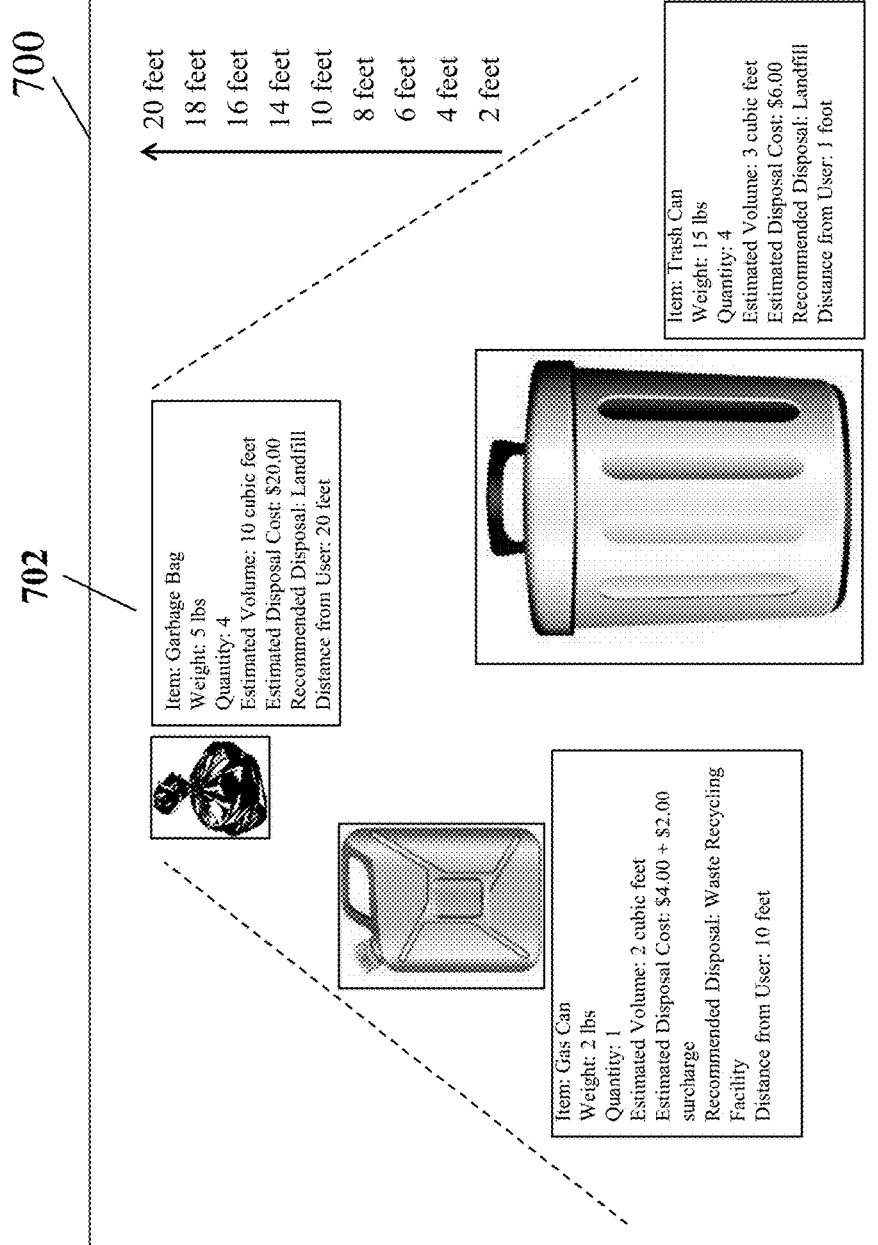
FIG. 7 is a screen layout of an augmented reality interface in an embodiment of the present invention.

FIG. 7 is a screen layout of an augmented reality interface in an embodiment of the present invention. In an embodiment, the user device 102 can be a wearable device equipped with an optical capture device, such as glasses, helmet, contact lenses, watches, or goggles that provide an augmented reality view 700 of the scene 104. In this embodiment, the user device 102 can be utilized by the user 100 (i.e., customer), or by the service provider 108 (i.e., employee, representative, moving professional, waste professional, etc.). The wearable device may display information 702 overlaid on the scene 104, such as object descriptions, attributes (distance from user device 102, weight, quantity, dimensions, size, volume, etc.), hazardous material or surcharge notices, and real-time cost estimates for each object. The user 100 can verbally select objects for removal, or can use gestures to point and select objects for removal. The augmented reality view is a real life view of the scene 104, thus the user 100 sees objects in their true spatial location relative to the user 100.

In the embodiment where the service provider 108 utilizes the wearable device, a representative 112 may visit the scene 104 and provide a real-time quotation using the wearable device. In an alternative embodiment, if the user 100 utilizes the wearable device, the user's display can be streamed to the representative 112, so that the representative may also experience the augmented display and provide feedback and responses to the user 100 regarding the services.

In an embodiment, the augmented display may be a three-dimensional display, a holographic display that is projected onto a surface or field of view, or a virtual reality display. For example, in a virtual reality display embodiment, the user 100 and representative 112 may interact with each other (via avatars) in a virtual world depicting the scene 104. The user 100 and representative 112 may measure and interact with objects in the scene 104, as if both parties were physically present in the actual scene 104.

In an embodiment, the service provider 108 includes a fleet management platform integrated with its cost estimation and scheduling features described above. Upon receiving requested date(s) and time(s) of service from a user 100, the CPU 110 cross references the desired service location with vehicles and employees who are available to fulfill the service. In an embodiment, the CPU 110 identifies available vehicles within the shortest distance from the service location on the desired dates that have capacity to transport the user's objects. In addition to travel distance, the third-party system also takes into account, for example, fuel costs, the estimated load size, labor availability, and availability of dump/recycling facilities on the requested dates, in order to select the appropriate service vehicle and employees for the user's service.

While the principles of the disclosure have been illustrated in relation to the exemplary embodiments shown herein, the principles of the disclosure are not limited thereto and include any modification, variation or permutation thereof.

What is claimed is:

1. A system for manipulating images for object detection purposes comprising:
 a mobile device comprising an optical recording device, a location transceiver, a display, and a wireless communication transceiver coupled to the optical recording device, the mobile device configured to capture scene data using the optical recording device, and transmit the scene data and location transceiver data using the wireless communication transceiver;
 a server comprising a communication transceiver configured to receive the scene data and the location transceiver data from the wireless communication transceiver, a central processing unit, and a database; and
 a central processing unit (CPU) configured to determine if the scene data is required to be cropped prior to object detection,
 wherein, in a case where the CPU determines that the scene data is not required to be cropped prior to object detection, the CPU is configured to transmit the scene data to a third-party system that is independent from the CPU and which can detect objects in the scene data using a machine learning or artificial intelligence technique, wherein the technique compares each of the objects with characteristics of known objects stored in the database, wherein the technique further determines at least one of a dimension, volume, or weight of each of the objects based on the comparison, and wherein the technique eliminates the need for a manual human inspection of the scene data in order determine the dimensions, volume, and weight of each of the objects, wherein, in a case where the CPU determines that the scene data is required to be cropped prior to object detection, the CPU is configured to crop the scene data corresponding to a location of an unidentified object and transmit the cropped scene data to the mobile device via the server, the CPU further configured to instruct the mobile device to display a request to enter a description of the unidentified object, calculate a cost to transport the objects from a location corresponding to the location transceiver data to a second location, wherein the cost is calculated based at least in part on at least one of the dimensions, volume, and weight of each the objects, the location transceiver data, the second location, and labor costs, and identify an available date for service by comparing an available service capacity of potential dates of service against at least one of the dimensions, volume, and weight of the objects and the location transceiver data, and transmit the cost and the available date for service to the mobile device, via the communication transceiver, for visual representation on the display;

wherein the CPU is configured to only execute the second operation if the CPU determines that there is an unidentified object present in the scene data at the conclusion of the first operation.

2. The system of claim 1, wherein the third-party system detects objects in the scene data using at least one feature-based method selected from a group consisting of interpretation trees, hypothesizing and testing, pose consistency, pose clustering, invariance, geometric hashing, and scale-invariant feature transform, and speeded up robust features.

3. The system of claim 1, wherein the scene data is video data.

4. The system of claim 1, wherein the optical recording device includes a laser rangefinder, a stereo camera, or a coded aperture.

5. The system of claim 1, wherein the location transceiver generates location transceiver data based on a global positioning system (GPS) module, by using signal strengths of home and neighboring network cells, by using a subscriber identity module (SIM) to obtain raw radio measurements from the mobile device, or by using WiFi data.

6. The system of claim 1, wherein the third-party system is further programmed to calculate the volume of the objects by using depth estimation technologies.

7. The system of claim 1, wherein the third-party system is further programmed to calculate the volume of the objects by using stored volume data associated with the objects in the database.

8. A method for manipulating images for object detection purposes comprising:
    capturing scene data, at a mobile device comprising an optical recording device, a location transceiver, a display, and a wireless communication transceiver;
    wirelessly transmitting the scene data and location data provided by the location transceiver from the mobile device to a server, wherein the server comprises a central processing unit (CPU);
    determining, by the CPU, if the scene data is required to be cropped prior to object detection;
    transmitting, by the CPU, the scene data to a third-party system if the CPU determines that the scene data is required to be cropped prior to object detection, wherein the third-party system is independent from the CPU, and the third-party system is configured to identify objects in the scene data using a machine learning or artificial intelligence technique, wherein the technique compares each of the objects with characteristics of known objects stored in a database, wherein the technique further determines at least one of a dimension, volume, or weight of each of the objects based on the comparison, and wherein the technique eliminates the need for a manual human inspection of the scene data in order determine the dimensions, volume, and weight of each of the objects;
    calculating, by the CPU, a cost to transport the objects based at least in part on the dimensions, volume, or weight of the objects and the location data;
    identifying, by the CPU, an available date for service by comparing an available service capacity of potential dates of service against at least one of the dimensions, volume, and weight of the identified objects and the location data;
    transmitting the cost and the available date for service from the server to the mobile device; and
    displaying a visual representation of the cost and the available date for service on the display of the mobile device;
    wherein, in a case where the CPU determines that the scene data is required to be cropped prior to object detection, the CPU is configured to determine if there is an unidentified object in the scene data, and wherein, in a case where the CPU determines that there is an unidentified object in the scene data, the CPU is configured to crop the scene data to create an unidentified object image, and the CPU is further configured to transmit the unidentified object image to the mobile device via the server, and the CPU is further configured to instruct the mobile device to display a request to enter a description of the unidentified object.

9. The method of claim 8, further comprising determining, by the third-party system, if each identified object is a hazardous object, an illegal object, an object requiring a transport surcharge, an object requiring a disposal surcharge, an object requiring a recycling surcharge.

10. The method of claim 8, further comprising determining, by the CPU, a disposal recommendation for each identified object.

11. The method of claim 8, further comprising determining, by the CPU, a recycling fee for the identified objects.

12. The method of claim 8, further comprising determining, by the CPU, a tax for the item transport services.

13. The method of claim 8, further comprising displaying a confirmation interface for the item transport services on the display of the mobile device.

14. A system for manipulating images for object detection purposes comprising:
    an optical recording device configured to capture scene data;
    a central processing unit (CPU) communicatively coupled to the optical recording device;
    a location transceiver communicatively coupled to the CPU, and configured to provide a location of the mobile device;
    a user interface communicatively coupled to the CPU, wherein the CPU unit is programmed to:

determine if the scene data is required to be cropped prior to object detection, wherein, in a case where the CPU determines that the scene data is not required to be cropped prior to object detection, transmit the scene data to a third-party system that is independent from the CPU, the third-party system configured to identify objects in the scene data using a machine learning or artificial intelligence technique, wherein the technique compares each of the objects with characteristics of known objects stored in a database, wherein the technique further determines at least one of a dimension, volume, or weight of each of the objects based on the comparison, and wherein the technique eliminates the need for a manual human inspection of the scene data in order determine the dimensions, volume, and weight of each of the objects, calculate a cost to transport the identified objects from the location to a second location, wherein the second location is a disposal location, and wherein the cost is calculated based at least in part on the dimensions, volume or weight of the identified objects and the distance between the location and the second location, transmit the cost to the display on the mobile device, and display a visual representation of the cost on the user interface, wherein, in a case where the CPU determines that the scene data is required to be cropped prior to object detection, the CPU is configured to determine if there is an unidentified object in the scene data, and wherein, in a case where the CPU determines that there is an unidentified object in the scene data, the CPU is configured to crop the scene data to create an unidentified object image, and the CPU is further configured to transmit the unidentified object image to the mobile device via the server, and the CPU is further configured to instruct the mobile device to display a request to enter a description of the unidentified object.

15. The system of claim 14, wherein the third-party system is further programmed to calculate the volume of the objects by using depth estimation technologies.

16. The system of claim 14, wherein the third-party system is further programmed to calculate the volume of the objects by using stored volume data associated with the detected objects in the database.

17. The system of claim 14, wherein the third-party system is further programmed to calculate a volume of the objects by using at least in part a focal length of the optical recording device.

18. The system of claim 14, wherein the second location is a starting location of a service vehicle prior to reaching the location.

19. The system of claim 14, wherein the cost is further calculated based on weather patterns.

20. The system of claim 14, wherein the third-party system detects objects in the scene data using at least one feature-based method selected from a group consisting of interpretation trees, hypothesizing and testing, pose consistency, pose clustering, invariance, geometric hashing, and scale-invariant feature transform, and speeded up robust features.

* * * * *